(12) United States Patent
Menon et al.

(10) Patent No.: US 9,731,477 B1
(45) Date of Patent: Aug. 15, 2017

(54) DISPLAY STACK FORMED TO MINIMIZE SUBSTRATE WARPING

(71) Applicant: Amazon Technologies, Inc., Reno, NV (US)

(72) Inventors: Anoop Menon, Capitola, CA (US); Keith Ho Soo Suan, Singapore (SG); Jori Juhani Oravasaari, Helsinki (FI); Yean Chan Woon, Singapore (SG); Weihsin Hou, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 855 days.

(21) Appl. No.: 14/012,779

(22) Filed: Aug. 28, 2013

(51) Int. Cl.
*B32B 7/12* (2006.01)
*B32B 37/14* (2006.01)

(52) U.S. Cl.
CPC .............. *B32B 7/12* (2013.01); *B32B 37/14* (2013.01)

(58) Field of Classification Search
CPC ................................. B32B 7/12; B32B 37/14
See application file for complete search history.

(56) References Cited

U.S. PATENT DOCUMENTS

2011/0177261 A1* 7/2011 Ishii .................. G02F 1/133308
428/1.5
2013/0034713 A1* 2/2013 Busman .................. G02B 1/04
428/217

FOREIGN PATENT DOCUMENTS

JP WO 2012138675 A1 * 10/2012 ....... G02F 1/133308
SG WO 2012036980 A2 * 3/2012 ........... G02F 1/1303

* cited by examiner

*Primary Examiner* — Daniel McNally
(74) *Attorney, Agent, or Firm* — Lee & Hayes, PLLC

(57) ABSTRACT

In some implementations, an electronic device includes a display stack to display content. The display stack can include a number of substrates coupled using a liquid optically clear adhesive (LOCA). In some implementations, the LOCA can have a modulus of elasticity of no greater than 80,000 Pa. Additionally, the display stack can be formed using a process that includes applying an external force to the display stack by placing the display stack between two fixtures. In an implementation, the external force can be applied while heating the display stack at a temperature of at least 60° C. and cooling the display stack according to a particular cooling rate.

20 Claims, 5 Drawing Sheets

DISPLAY STACK FORMED TO MINIMIZE SUBSTRATE WARPING

BACKGROUND

Electronic displays (also referred to herein as "displays") are found in numerous types of electronic devices such as electronic book ("eBook") readers, mobile telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the electronic device that includes the electronic display. In some cases, the processes used to assemble an electronic display and/or the materials included in the electronic display may affect a user's experience with the electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
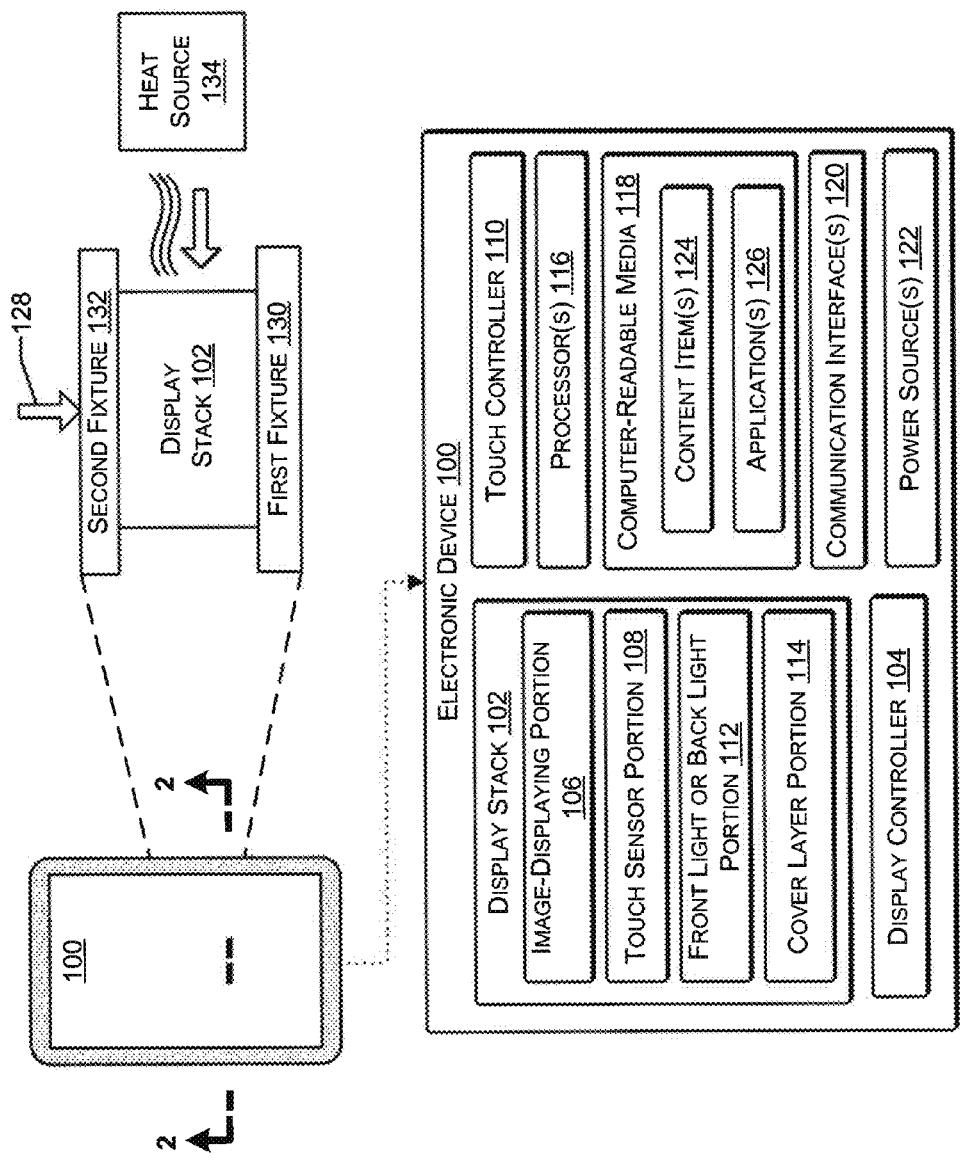
FIG. 1 illustrates an example electronic device that includes a display stack including a liquid optically clear adhesive (LOCA) having a modulus of elasticity below a threshold modulus of elasticity and the display stack is formed by applying an external force and heat.

This disclosure describes, in part, electronic devices that include electronic displays that present content and other information. The electronic displays can include a display stack that includes a number of layers, such as a number of substrates and one or more adhesive layers. For example, a display stack can include an image-displaying portion that displays content. Additionally, a number of additional substrates can be stacked on top of the image-displaying portion. To illustrate, a display stack can include a touch sensor portion that generates signals in response to an input device contacting the display. In some cases, a top substrate of the display stack can include a cover layer portion to protect other substrates of the display stack. The cover layer portion can include antiglare properties, antireflective properties, anti-fingerprint properties, anti-cracking properties, and the like. The display stack can also include a lighting portion, such as a front lighting portion or a backlight lighting portion to provide light to view the content rendered on the image-rendering portion. In some implementations, the display stack can include a number of additional substrates.

At least a portion of the substrates of the display stack may be coupled together using one or more adhesives. In some cases, the physical properties and the optical properties of the one or more adhesives can affect the quality of the appearance of the content presented on the display and can affect the experience of a user with respect to the electronic device that includes the display stack. For example, an adhesive included in a display stack can be optically clear or substantially optically clear to provide a clear view of content presented on an image-displaying portion of the display stack. Additionally, an adhesive included in a display stack can have a refractive index that reduces any reflection of light within the display stack.

In other situations, substrates included in the display stack can warp due to physical properties of one or more substrates of the display stack and/or due to process conditions under which the display stack is assembled. To illustrate, a coefficient of thermal expansion of a first substrate of a display stack can be different from a coefficient of thermal expansion of a second substrate of the display stack. In a particular example, one substrate can include polyethylene terephthalate (PET), and have a coefficient of thermal expansion of about 40 ppm/° C., while another substrate can include polymethylmethacrylate (PMMA), and have a coefficient of thermal expansion of about 70 ppm/° C.

Thus, as the substrates of the display stack are heated and cooled during assembly of the display stack and/or during use by an individual, the first substrate and the second substrate can expand and contract at different rates. The differences in the expansion and contraction of the substrates can place stresses on the substrates. Consequently, one or more of the substrates of the display stack can warp, which can possibly lead to damage to the display stack and/or damage to the electronic device that includes the display stack. In some cases, display stacks can be assembled at temperatures of no greater than 50° C. in an attempt to reduce warpage of substrates of the display stacks. Damage to the display stack caused by a warped substrate and/or damage to the electronic device including a warped substrate can negatively impact a user's experience with the electronic device.

Accordingly, in some implementations described herein, a liquid optically clear adhesive (LOCA) can be utilized to couple a first substrate of a display stack to a second substrate of the display stack. The LOCA can have a modulus of elasticity less than a threshold modulus of elasticity, such as less than 80,000 Pa. In a particular implementation, the modulus of elasticity of the LOCA can be indicated by a percent elongation of the LOCA at break. In an illustrative implementation, the percent elongation of the LOCA at break can be at least 350%. By coupling at least two substrates of a display stack with a LOCA having a modulus of elasticity no greater than a threshold modulus of elasticity, the defects due to the warping of substrates included in the display stack can be minimized. In particular, the LOCA with a modulus of elasticity no greater than the threshold modulus of elasticity can provide a relatively flexible layer as the display stack undergoes temperature changes. The flexible LOCA layer can decrease warping of substrates of the display stack that may occur due to differences in coefficients of thermal expansion of the substrates included in the display stack by reducing the stresses on the substrates of the display stack.

Additionally, during the assembly of the display stack, an external force can be directly applied to the display stack to decrease warping of substrates included in the display stack. Further, the display stack can be heated and cooled under specified conditions to decrease warping of substrates of the display stack. For example, after coupling the substrates of the display stack, the display stack can be heated at a temperature of at least 60° C. for a specified duration. Subsequently, the display stack can be cooled at a specified rate, such as a rate included in a range of 0.5° C./minute to 2° C./minute. The heating and/or cooling of the display stack under specified conditions can result in bonding between molecules of the LOCA layer across a broader temperature range such that the bonds between the molecules of the LOCA layer are less likely to change as the display stack experiences subsequent temperature changes. In this way, warping of the substrates of the display stack can also be minimized as the display stack is heated and cooled after undergoing the assembly process.

FIG. 1 illustrates an example electronic device 100 that includes a display stack 102 including a liquid optically clear adhesive (LOCA) having a modulus of elasticity below a threshold modulus of elasticity, and the display stack 102 is formed by applying an external force and heat. The electronic device 100 can include any type of electronic device having a display. For instance, the electronic device 100 can be a mobile electronic device, such as an electronic book reader, a tablet computing device, a laptop computer, a smart phone or other multifunction communication device, a portable digital assistant, a media player, a wearable computing device, an automotive display, combinations thereof, and the like. Alternatively, the electronic device 100 may be a non-mobile electronic device, such as a computer display, a desktop computing device, a television, a household appliance, industrial equipment, combinations thereof, and so forth. In addition, while FIG. 1 illustrates several example components of the electronic device 100, it is to be appreciated that the device 100 can also include other components, such as an operating system, system busses, input/output components, and the like. Further, in other examples, such as in the case of a television or computer monitor, the electronic device 100 can include a subset of the components shown.

Regardless of the specific implementation of the electronic device 100, the electronic device 100 includes the display stack 102 and a corresponding display controller 104. The display stack 102 can include an image-displaying portion 106 that can display content via one or more image producing technologies. For example, the image-displaying portion 106 can include a reflective display, such as an electronic paper display, a reflective liquid crystal display (LCD), or the like. Electronic paper displays represent an array of display technologies that can mimic the look of ordinary ink on paper. In contrast to conventional backlit displays, electronic paper displays typically reflect light, much as ordinary paper does. In addition, electronic paper displays can be bi-stable, meaning that these displays are capable of holding text or other displayed images even when very little or no power is supplied to the display. Some examples of the image-displaying portion 106 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 100, the image-displaying portion 106 can include an active display such as a liquid crystal display, a plasma display, a light emitting diode display, an organic light emitting diode display, and so forth. Accordingly, implementations herein are not limited to any particular display technology.

In one implementation, the image-displaying portion 106 includes an electrophoretic display that moves particles between different positions to achieve different color shades. For instance, in a pixel that is free from a color filter, the pixel can be configured to produce white when the particles within this pixel are located at the front (i.e., viewing) side of the image-displaying portion 106. When situated in this manner, the particles reflect incident light, thus giving the appearance of a white pixel. Conversely, when the particles are pushed near the rear of the image-displaying portion 106, the image-displaying portion 106 absorbs the incident light and, hence, causes the pixel to appear black to a viewing user. In addition, the particles can be situated at varying locations between the front and rear sides of the image-displaying portion 106 to produce varying shades of gray. Furthermore, as used herein, a "white" pixel can include any shade of white or off white, while a "black" pixel can include any shade of black.

In another implementation, the image-displaying portion 106 can include an electrophoretic display that includes oppositely charged light and dark particles. In these implementations, to create white, the display controller 104 can move light particles to the front side of the image-displaying portion 106 by creating a corresponding charge at an electrode near the front of the image-displaying portion 106 and moves the dark particles to the back of the image-displaying portion 106 by creating a corresponding charge at an electrode near the back. In order to create black, meanwhile, the display controller 104 changes the polarities and moves the dark particles to the front of the image-displaying portion 106 and the light particles to the back of the image-displaying portion 106. Furthermore, to create varying shades of gray, the display controller 104 can utilize different arrays of both light and dark particles. In some cases, the particles can be contained in individual transparent capsules. In a particular example, the capsules can have a diameter included in a range of 35 micrometers to 45 micrometers. The capsules can be suspended in a fluid, such as a liquid polymer, between a transparent upper electrode grid layer and a lower electrode grid layer separated by a gap of approximately 50 micrometers to 200 micrometers.

While several different examples have been given, the reflective displays described herein can comprise any other type of electronic-paper technology or reflective-display technology. In addition, while some of the examples described above are discussed as displaying black, white, and varying shades of gray, the described techniques can also apply to reflective displays capable of displaying color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the image-displaying portion 106 may represent a backlit display, examples of which are mentioned above.

In addition to including the image-displaying portion 106, the electronic device 100 can include a touch sensor portion 108 and a touch controller 110. In some instances, at least one touch sensor portion 108 resides with, or is stacked on, the image-displaying portion 106 to form a touch-sensitive display (e.g., an electronic paper touch-sensitive display). Thus, the display stack 102 can be capable of both accepting user touch input and displaying content in response to or corresponding to the touch input. As several examples, the touch sensor portion 108 can include a capacitive touch sensor, a force sensitive resistance (FSR), an interpolating force sensitive resistance (IFSR) sensor, or any other type of touch sensor. In some instances, the touch sensor portion 108 is capable of detecting touches as well as determining an amount of pressure or force of these touches.

The electronic device 100 can also include a front light portion 112 (which may alternatively be a backlight component in the case of a backlit display) for lighting the display stack 102. The front light portion 112 can include a light guide portion and a light source (not shown in FIG. 1). The light guide portion can include a substrate including a transparent thermoplastic polymer. For example, the light guide portion can include an acrylic polymer. In one implementation, the light guide portion can include polymethylmethacrylate (PMMA). In a particular implementation, the light guide portion can include a substrate, a layer of lacquer and multiple grating elements formed in the layer of lacquer. The multiple grating elements can be configured to propagate light to illuminate the image-displaying portion 106.

Furthermore, the amount of light emitted by the front light portion 112 may vary. For instance, upon a user opening a cover (not shown in FIG. 1) of the electronic device 100, the light from the front light portion 112 may gradually increase to its full illumination. In some instances, the electronic device 100 includes an ambient light sensor (not shown in FIG. 1) and the amount of illumination of the front light portion 112 can be based at least in part on the amount of ambient light detected by the ambient light sensor. For example, the front light portion 112 can be dimmer if the ambient light sensor detects relatively little ambient light, such as in a dark room; can be brighter if the ambient light sensor detects ambient light within a particular range; and can be dimmer or turned off if the ambient light sensor detects a relatively large amount of ambient light, such as direct sunlight.

In addition, the settings of the image-displaying portion 106 can vary depending on whether the front light portion 112 is on or off, or based on the amount of light provided by the front light portion 112. For instance, the electronic device 100 can implement a larger default font or a greater contrast when the front light portion 112 is off compared to when the front light portion 112 is on. In some instances, the electronic device 100 maintains, when the front light portion 112 is on, a contrast ratio for the image-displaying portion 106 that is within a certain defined percentage of the contrast ratio when the front light portion 112 is off.

In addition, the electronic device 100 can include a cover layer portion 114. The cover layer portion 114 can include a transparent substrate or sheet having an outer layer that functions to reduce at least one of glare or reflection of ambient light incident on the electronic device 100. In some instances, the cover layer portion 114 can include a film including a polyester, a polycarbonate, or both. In some instances, the film can be manufactured with additives such that the resulting film includes a hardness rating that is greater than a predefined threshold. In this way, the cover layer portion 114 can be resistant to scratches caused by objects having a hardness rating less than the predefined threshold. In a particular example, the threshold hardness rating can include at least a hardness rating that is resistant to a 3h pencil. Without such scratch resistance, the electronic device 100 can be more easily scratched and a user may perceive the scratches from the light that is dispersed over the top of the reflective display. The cover layer portion 114 may, in some instances, include a UV filter, a UV-absorbing dye, or the like, for protecting components in the display stack 102 from UV light incident on the electronic device 100. In still other examples, the cover layer portion 114 may include a sheet of high-strength glass having an antiglare and/or antireflective coating.

In an implementation, the touch sensor portion 108 can be disposed atop the image-displaying portion 106. In some examples, the touch sensor portion 108 can be formed on or integrated with the cover layer portion 114. In other examples, the touch sensor portion 108 may be a separate component in display stack 102. Additionally, the front light portion 112 can be disposed atop or below the touch sensor portion 108. In some instances, either the touch sensor portion 108 or the front light portion 112 is coupled to a top surface of the image-displaying portion 106. In some instances, the cover layer portion 114 can couple to another component or to the image-displaying portion 106.

The electronic device 100 can include one or more processors 116 and one or more computer-readable media 118, one or more communication interfaces 120 and one or more power sources 122. The communication interfaces 120 can support both wired and wireless connection to various networks, such as cellular networks, radio, WiFi networks, short range networks (e.g., Bluetooth®), infrared (IR), and so forth.

Depending on the configuration of the electronic device 100, the computer-readable media 118 (and other computer-readable media described throughout) is an example of computer storage media and can include volatile and non-volatile memory. Thus, the computer-readable media 118 can include, but is not limited to, RAM, ROM, EEPROM, flash memory, or other memory technology, or any other medium that can be used to store computer-readable instructions, programs, applications, media items, and/or data which can be accessed by the electronic device 100.

The computer-readable media 118 can be used to store any number of functional components that are executable on the processor 116, as well as content items 124 and applications 126. Thus, the computer-readable media 118 can include an operating system and a storage database to store one or more of the content items 124, such as eBooks, audio books, songs, videos, still images, and the like. The computer-readable media 118 of the electronic device 100 can also store one or more content presentation applications to render the content items 124 on the electronic device 100 via the image-rendering portion 106. These content presentation applications may be implemented as various applications 126 depending upon the content items 124 being rendered. For instance, a content presentation application 126 can include an electronic book reader application for presenting textual electronic books. In other cases, the applications 126 can include an audio player for playing audio books or songs, a video player for playing video, and so forth.

In an illustrative implementation, the display stack 102 can be formed by combining a number of substrates, such as the image-displaying portion 106, the touch sensor portion 108, and the cover layer portion 114. In some cases, the display stack 102 can also include the lighting portion 112, such as a front light portion or a back light portion. The display stack 102 can also include additional substrates and/or layers not shown in FIG. 1. For example, the image-displaying portion 106 can include a substrate layer of glass or plastic (e.g., front plane laminate), one or more layers of electrodes, a flexible printed circuit layer, a protective sheet to reduce discoloration in the display stack 102, a display material substrate (e.g., an e-ink display layer having e-ink capsules and a corresponding carrier fluid), combinations thereof, and the like.

In some cases, the substrates of the display stack 102 can be coupled using one or more adhesives. In an implementation, at least a portion of the substrates of the display stack 102 can be coupled using an optically clear adhesive (OCA). In another implementation, at least a portion of the substrates of the display stack 102 can be coupled using a liquid optically clear adhesive (LOCA). In a particular implementation, the front light portion 112 can be coupled to the touch sensor portion 108 with an OCA. In another embodiment, the front light portion 112 can be coupled to the image-displaying portion 106 using a LOCA. In one implementation, the touch sensor portion 108 can be coupled to the cover layer portion 114 using a LOCA. In other implementations, the touch sensor portion 108 can be coupled to the image-displaying portion 106 using a LOCA.

In some cases, the LOCA can have a modulus of elasticity of no greater than a threshold modulus of elasticity, such as 80,000 Pa. The modulus of elasticity can be indicated by a percent elongation of the LOCA at break. In a particular implementation, the LOCA can have a percent elongation at break included in a range of 100% to 400%. In addition, the LOCA can be a silicon-containing LOCA, an acrylic-containing LOCA, or a fluorine-containing LOCA. In a particular implementation, the LOCA can be a silicone-containing LOCA. In some implementations, a LOCA can have a transmittance of radiation of a specified wavelength (e.g., 550 nm) of at least 95%, at least 98%, at least 99%, or at least 99.5%.

Further, after the substrates of the display stack 102 are assembled using the one or more adhesives, an external force 128 can be applied to the display stack 102. For example, the display stack 102 can be coupled between a first fixture 130 and a second fixture 132 of an apparatus. In an implementation, the first fixture 130 and the second fixture 132 can include a glass-containing material. In one illustrative implementation, the display stack 102 can be placed in the apparatus such that the display stack 102 is resting on the first fixture 130. Additionally, the external force 128 can be applied to the display stack 102 by moving the second fixture 132 toward the first fixture 130. In some implementations, the external force 128 can be at least 3 kgf. By applying the external force 128 to the display stack 102, warping of the substrates of the display stack 102 can be minimized as the display stack 102 is exposed to different temperatures.

Although the illustrative example of FIG. 1 indicates that the external force 128 is being applied in a downward direction with respect to an external surface of the second fixture 132, in some implementations, an external force can be applied in an upward direction with respect to an external surface of the first fixture 130. In addition, an external force can be applied to the display stack 102 in both an upward direction and a downward direction. Further, although the illustrative example of FIG. 1 has been described in relation to applying an external force to the display stack 102 with the first fixture 130 and the second fixture 132 in a vertical orientation, in some situations, the external force can be applied to the display stack 102 with the first fixture 130 and the second fixture 132 situated in a horizontal orientation.

Further, heat can be applied to the display stack 102 using a heat source 134. In an implementation, the heat source 134 can be included in a chamber holding the display stack 102. The chamber can also include the first fixture 130 and the second fixture 132. In some implementations, the display stack 102 can be heated at a temperature of at least 60° C. The cooling rate of the display stack 102 can also be controlled such that the temperature applied to the display stack 102 is reduced at a rate included in a range of 0.5° C./minute to 2° C./minute. By heating the display stack 102 at a temperature of at least 60° C. and subsequently reducing the temperature applied to the display stack 102 in a controlled manner, the warping of substrates of the display stack 102 can be minimized. In particular, the bonds formed between the molecules of the LOCA of the display stack at temperatures above 60° C. can minimize further changes to the molecules of the LOCA during subsequent exposures of the display stack 102 to temperatures of at least 30° C.

In some implementations, the display stack 102 can be formed by utilizing at least one adhesive with a modulus of elasticity no greater than 80,000 Pa, and applying both heat and an external force during the formation of the display stack 102. In other implementations, the display stack 102 can be formed by utilizing at least one adhesive with a modulus of elasticity no greater than 80,000 Pa and applying either heat or an external force during the formation of the display stack 102. In still other implementations, the display stack 102 can be formed by applying heat and/or an external force as described herein.

Figure 2:
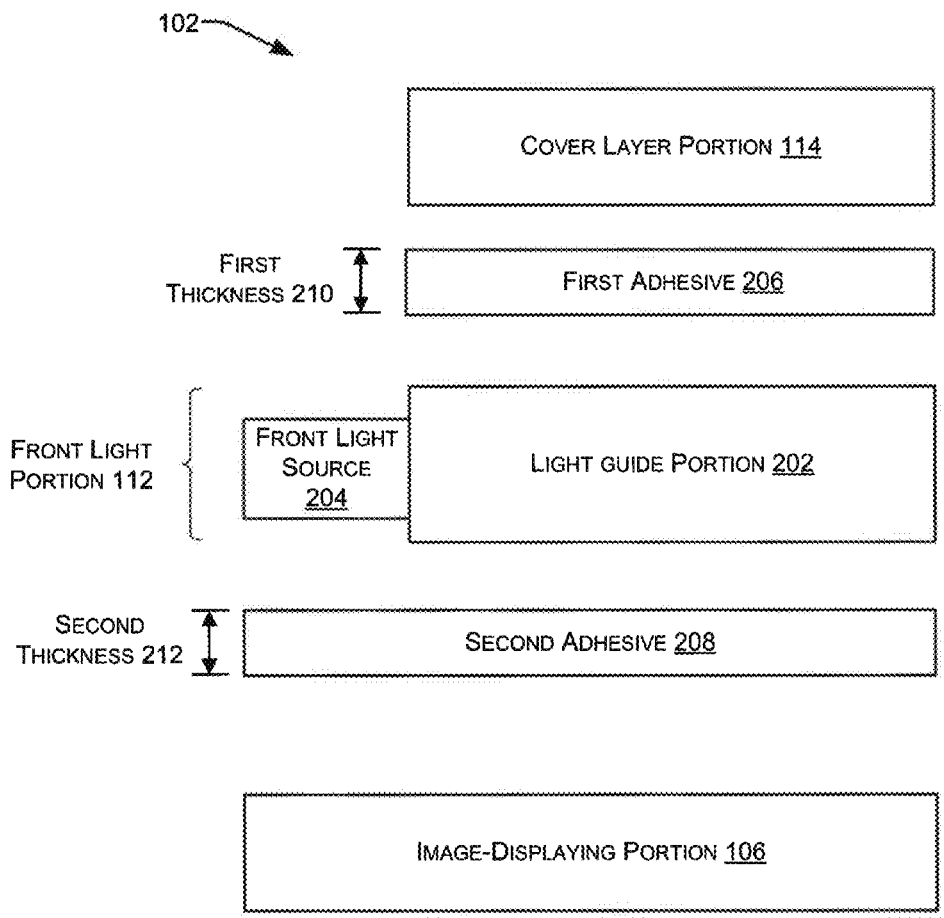
FIG. 2 illustrates an example schematic cross-section of the display stack including a liquid optically clear adhesive (LOCA) having a modulus of elasticity below a threshold modulus of elasticity and the display stack is formed by applying an external force and heat.

FIG. 2 illustrates an example schematic cross-section of the display stack 102 taken along line 2-2 of FIG. 1, where the display stack 102 includes a liquid optically clear adhesive (LOCA) having a modulus of elasticity below a threshold, and the display stack 102 is formed by applying an external force and heat. In the illustrative example of FIG. 2, the display stack 102 includes the image-displaying portion 106 to present content. In an implementation, the image-displaying portion 106 can be formed by coating e-ink onto a film, such as via a roll-to-roll process.

The display stack 102 can also include a front light portion 112 that includes a light guide portion 202 and a front light source 204. The light guide portion 202 can include material that includes etchings, gratings or other patterns formed thereon for directing light from the front light source 204 to illuminate the image-displaying portion 106. In a particular implementation, the light guide portion 202 includes an acrylic-containing material. In an illustrative implementation, the light guide portion 202 can include PMMA. In some implementations, the front light source 204 can include one or more light emitting diodes or other suitable sources of illumination positioned on one or more edges of the light guide portion 202.

Additionally, the display stack 102 includes the cover layer portion 114. The cover layer portion 114 can have one or more layers that include antiglare properties, antireflective properties, anti-smudge properties, crack-resistant properties, scratch-resistant properties, a specified hardness, or combinations thereof. Furthermore, the display stack 102 can include one or more additional components, such as a touch sensor portion to detect user input via an input device (e.g., a finger, a stylus, etc.). In some implementations, the touch sensor portion can be coupled to the cover layer portion 114. In other implementations, the touch sensor portion can be coupled to the image-displaying portion 106.

The display stack 102 can also include a first adhesive 206 and a second adhesive 208. The first adhesive 206 and the second adhesive 208 can bond a number of substrates of the display stack 102 together. For example, the first adhesive 206 can bond at least the cover layer portion 114 to the front light portion 112. Additionally, the second adhesive 208 can bond at least the image-displaying portion 106 to the front light portion 112.

In an implementation, the first adhesive 206 can include an optically clear adhesive (OCA) and the second adhesive 208 can include a liquid optically clear adhesive (LOCA). In another implementation, the first adhesive 206 and the second adhesive 208 can both include a LOCA. In one example, the first adhesive 206, the second adhesive 208, or both can include a silicone-containing adhesive, an acrylic-containing adhesive, or a fluorine-containing adhesive. To illustrate, the first adhesive 206, the second adhesive 208, or both can include a silicone-containing LOCA, an acrylic-containing LOCA, or a fluorine-containing LOCA.

In a particular implementation, the first adhesive 206, the second adhesive 208, or both can have a refractive index no greater than 1.51, no greater than 1.49, or no greater than 1.47. In other implementations, the first adhesive 206, the second adhesive 208, or both can have a refractive index of at least 1.39, at least 1.41, or at least 1.44. In an illustrative implementation, the first adhesive 206, the second adhesive 208, or both can have a refractive index included in a range of 1.37 to 1.52. In another illustrative implementation, the first adhesive 206, the second adhesive 208, or both can have a refractive index included in a range of 1.40 to 1.45. In some scenarios, the refractive index of the first adhesive 206, the second adhesive 208, or both can aid in reflecting light from the front light portion 112 to provide suitable illumination for the image-displaying portion 106.

Additionally, in some instances, the first adhesive 206, the second adhesive 208, or both can have a tensile strength of at least 225,000 Pa, at least 250,000 Pa, or at least 275,000 Pa. In other implementations, the first adhesive 206, the second adhesive 208, or both can have a tensile strength of no greater than 350,000 Pa, no greater than 325,000 Pa, or no greater than 300,000 Pa. In an illustrative implementation, the first adhesive 206, the second adhesive 208, or both can have a tensile strength included in a range of 220,000 Pa to 360,000 Pa. In another illustrative implementation, the first adhesive 206, the second adhesive 208, or both have a tensile strength included in a range of 280,000 Pa to 320,000 Pa. In one implementation, the tensile strength of the first adhesive 206, the second adhesive 208, or both can be measured according to the ASTM D412 standard at the time of filing this application.

Further, in some implementations, the first adhesive 206, the second adhesive 208, or both can have a modulus of elasticity of no greater than 80,000 Pa, no greater than 72,000 Pa, or no greater than 65,000 Pa. In addition, the first adhesive 206, the second adhesive 208, or both can have a modulus of elasticity of at least 46,000 Pa, at least 55,000 Pa, or at least 61,000 Pa. In an illustrative implementation, the first adhesive 206, the second adhesive 208, or both can have a modulus of elasticity included in a range of 42,000 Pa to 83,000 Pa. In another illustrative implementation, the first adhesive 206, the second adhesive 208, or both can have a modulus of elasticity included in a range of 58,000 Pa to 63,000 Pa.

In other implementations, the first adhesive 206, the second adhesive 208, or both can have a modulus of elasticity of no greater than 350,000 Pa, no greater than 300,000 Pa, or no greater than 250,000 Pa. Further, the first adhesive 206, the second adhesive 208, or both can have a modulus of elasticity of at least 150,000 Pa, at least 180,000 Pa, or at least 220,000 Pa. In an illustrative implementation, the first adhesive 206, the second adhesive 208, or both can have a modulus of elasticity included in a range of 140,000 Pa to 200,000 Pa. In another illustrative implementation, the first adhesive 206, the second adhesive 208, or both can have a modulus of elasticity included in a range of 290,000 Pa to 340,000 Pa.

The first adhesive 206, the second adhesive 208, or both can also have a dynamic modulus of no greater than 12,000 Pa, no greater than 10,000 Pa, or no greater than 8000 Pa. Additionally, the first adhesive 206, the second adhesive 208, or both can have a dynamic modulus of at least 1000 Pa, at least 3000 Pa, or at least 5000 Pa. In an illustrative implementation, the first adhesive 206, the second adhesive 208, or both can have a dynamic modulus included in a range of 700 Pa to 12,500 Pa. In another illustrative implementation, the first adhesive 206, the second adhesive, or both can have a dynamic modulus included in a range of 2500 Pa to 7500 Pa.

In a particular implementation, the first adhesive 206, the second adhesive 208, or both, can have a percent elongation at break of at least 340%, at least 360%, or at least 380%. In addition, the first adhesive 206, the second adhesive 208, or both can have a percent elongation at break of no greater than 450%, no greater than 425%, or no greater than 400%. In an illustrative implementation, the first adhesive 206, the second adhesive 208, or both can have a percent elongation at break included in a range of 325% to 475%. In another illustrative implementation, the first adhesive 206, the second adhesive 208, or both can have a percent elongation at break included in a range of 375% to 425%.

In additional implementations, the first adhesive 206, the second adhesive 208, or both, can have a percent elongation at break of at least 100%, at least 115%, or at least 130%. In addition, the first adhesive 206, the second adhesive 208, or both can have a percent elongation at break of no greater than 180%, no greater than 160%, or no greater than 140%. In an illustrative implementation, the first adhesive 206, the second adhesive 208, or both can have a percent elongation at break included in a range of 90% to 190%. In another illustrative implementation, the first adhesive 206, the second adhesive 208, or both can have a percent elongation at break included in a range of 125% to 145%. In one implementation, the percent elongation at break of the first adhesive 206, the second adhesive 208, or both can be measured according to the ASTM D412 standard at the time of filing this application.

Further, the first adhesive 206, the second adhesive 208, or both can have a percent shrinkage of no greater than 1.1%, no greater than 0.8%, or no greater than 0.5%. In other implementations, the first adhesive 206, the second adhesive 208, or both can have a percent shrinkage of at least 0.1%, at least 0.2%, or at least 0.3%. In an illustrative implementation, the first adhesive 206, the second adhesive 208, or both can have a percent shrinkage included in a range of 0.1% to 0.5%. In one implementation, the percent shrinkage of the first adhesive 206, the second adhesive 208, or both can be measured according to the STM 753 standard at the time of filing this application.

In an implementation, the first adhesive 206, the second adhesive 208, or both can have a shore OO hardness of at least 55, at least 57, or at least 61. In addition, the first adhesive 206, the second adhesive 208, or both can have a shore OO hardness of no greater than 66, no greater than 64, or no greater than 62. In an illustrative implementation, the first adhesive 206, the second adhesive 208, or both can have a shore OO hardness included in range of 59 to 65.

In other implementations, the first adhesive 206, the second adhesive 208, or both can have a shore OO hardness of at least 67, at least 69, or at least 71. Further, the first adhesive 206, the second adhesive 208, or both can have a shore OO hardness of no greater than 81, no greater than 77, or no greater than 74. In an illustrative implementation, the first adhesive 206, the second adhesive 208, or both can have a shore OO hardness included in a range of 68 to 73. In another illustrative implementation, the first adhesive 206, the second adhesive 208, or both can have a shore OO hardness included in a range of 76 to 80. In an implementation, the shore OO hardness of the first adhesive 206, the second adhesive 208, or both can be measured according to the ASTM D2240 standard at the time of filing this application.

In an additional implementation, the first adhesive 206 can have a first thickness 210 and the second adhesive 208 can have a second thickness 212. In a particular implementation, the first thickness 210, the second thickness 212, or both can be at least 50 micrometers, at least 100 micrometers, or at least 150 micrometers. In another implementation, the first thickness 210, the second thickness 212, or both can be no greater than 300 micrometers, no greater than 250 micrometers, or no greater than 200 micrometers. In an illustrative implementation, the first thickness 210, the second thickness 212, or both can be included in a range of 25 micrometers to 400 micrometers. In an additional illustrative implementation, the first thickness 210, the second thickness 212, or both can be included in a range of 40 micrometers to 110 micrometers.

Figure 3:
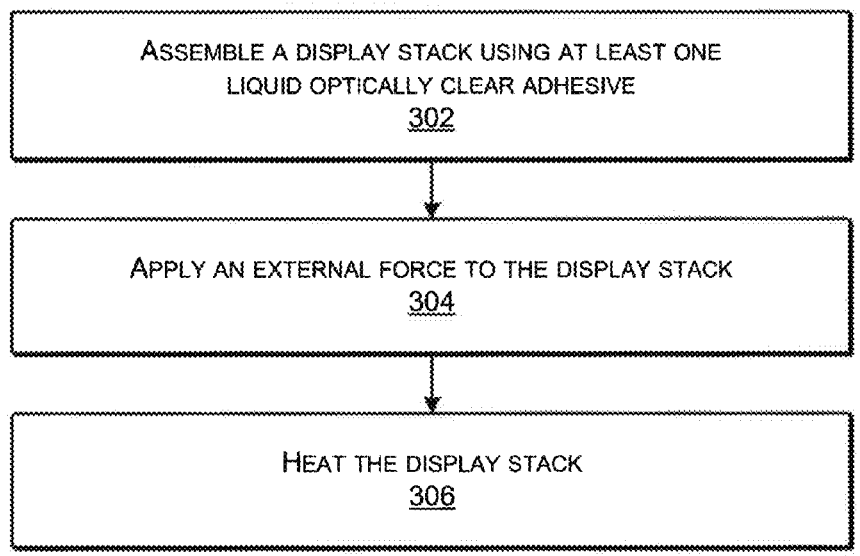
FIG. 3 illustrates a flow diagram of an example process to assemble a display stack formed by applying an external force and heat.

FIG. 3 illustrates a flow diagram of an example process 300 to assemble a display stack formed by applying an external force and heat. In some implementations, the display stack can include the display stack 102 of FIG. 1 and FIG. 2. The order in which the operations are described is not intended to be construed as a limitation, and any number of the described operations can be combined in any order and/or in parallel to implement the process.

At 302, the process 300 includes assembling a display stack using at least one liquid optically clear adhesive (LOCA). In an implementation, the display stack can be assembled by coupling a number of substrates to each other. For example, the display stack can include an image-displaying portion, a front light portion, a touch sensor portion, a cover layer portion, or a combination thereof. At least a portion of the substrates can be coupled with each other using one or more adhesives, such as an optically clear adhesive (OCA), a LOCA, or both.

In an illustrative implementation, the display stack can be assembled by applying an adhesive to a front light portion. In some implementations, the adhesive can include an OCA, while in other implementations, the adhesive can include an LOCA. In a particular implementation, the adhesive can be applied to the front light portion using lamination techniques, such as roll-to-roll lamination techniques. In another implementation, the adhesive can be applied to the front light portion using a printing technique. In some cases, the adhesive can be applied to the front light portion at a temperature included in a range of 15° C. to 30° C. Additionally, in some implementations, the adhesive and the front light portion can be heat pressed between two plates at a temperature included in a range of 65° C. to 100° C. for a duration included in a range of 1 minute to 5 minutes.

Further, the display stack can be assembled by coupling the cover layer portion to the adhesive and the front light portion. The cover layer portion can be coupled to the adhesive and the front light portion using lamination techniques, such as screen lamination techniques. In an implementation, the cover layer portion can be coupled to the adhesive and the front light portion at a temperature included in a range of 15° C. to 30° C. In a particular implementation, a touch sensor portion can be coupled with the cover layer portion and the touch sensor portion can be coupled with the adhesive and the front light portion.

Assembling the display stack can also include coupling the cover layer portion, the adhesive, and the front light portion to an image-displaying portion. In an implementation, the image-displaying portion can include an electronic paper display. The image-displaying portion can be coupled to the cover layer portion, the adhesive, and the front light portion with a LOCA using lamination techniques, such as mechanical lamination techniques. In some implementations, the LOCA can be applied to a surface of the front light portion or a surface of the image-displaying portion using printing techniques, such as stencil printing or screen printing. In other implementations, the LOCA can be applied to a surface of the front light portion or a surface of the image-displaying portion using a coating process, such as a die coating process. The image-displaying portion can be coupled with the cover layer portion, the adhesive, and the front light portion using the LOCA at a temperature included in a range of 15° C. to 30° C. In some cases, the LOCA can have a modulus of elasticity of no greater than 80,000 Pa. In other situations, the LOCA can have a modulus of elasticity of at least 150,000 Pa.

In an implementation, when coupling the front light portion/adhesive/cover layer portion with the image-displaying portion, the LOCA can have a viscosity of at least 28,000 centipoise (cp), at least 30,000 cp, or at least 32,000 cp. In another implementation, the LOCA can have a viscosity of no greater than 42,000 cp, no greater than 39,000 cp, or no greater than 35,000 cp. In an illustrative implementation, the LOCA can have a viscosity included in a range of 31,000 cp to 39,000 cp.

In other implementations, the LOCA can have a viscosity of no greater than 5500 cp, no greater than 5000 cp, or no greater than 4500 cp. In addition, the LOCA can have a viscosity of at least 2000 cp, at least 2500 cp, or at least 3000 cp. In an illustrative implementation, the viscosity of the LOCA can be included in a range of 2200 to 2900 cp. In another illustrative implementation, the viscosity of the LOCA can be included in a range of 4200 cp to 4700 cp. In an implementation, the viscosity of the LOCA can be measured at about 25° C. using a cone and plate viscometer at 20 revolutions/second.

In some scenarios, assembling the display stack can include pre-curing the LOCA. For example, the display stack can be exposed to ultraviolet (UV) radiation to pre-cure the LOCA. In an implementation, the LOCA can be exposed to UV radiation for a duration included in a range of 30 seconds to 120 seconds. In another implementation, the LOCA can be exposed to UV radiation for a duration included in a range of 80 seconds to 110 seconds. In a particular implementation, the UV radiation applied to the display stack can have wavelengths included in a range of 300 nm to 400 nm. In an illustrative implementation, the UV radiation can be applied to the LOCA until the LOCA is at least 50% cured, at least 55% cured, or at least 60% cured. In another illustrative implementation, the UV radiation can be applied to the LOCA until no greater than 75% of the LOCA is cured, no greater than 70% of the LOCA is cured, or no greater than 65% of the LOCA is cured. In a further illustrative implementation, the UV radiation can be applied to the LOCA until 65% to 75% of the LOCA is cured.

At 304, the process 300 includes applying an external force to the display stack. In a particular implementation, the display stack can be coupled between a first fixture of an apparatus and a second fixture of the apparatus. The first fixture and the second fixture can include a glass material. In some instances, the first fixture, the second fixture, or both can move relative to one another to apply the external weight to the display stack. For example, in one implementation, a display substrate, such as an image-displaying portion, of the display stack can rest on the first fixture, while the second fixture is moved toward the first fixture to be in contact with another substrate of the display stack, such as a cover layer portion. After contacting the display stack, the second fixture can continue to move toward the first fixture until a specified external force is applied to the display stack.

In a particular implementation, the external force applied to the display stack can be at least 1 kgf, at least 2 kgf, or at least 3 kgf. In another implementation, the external force applied to the display stack can be no greater than 10 kgf, no greater than 8 kgf, or no greater than 6 kgf. In an illustrative implementation, the external force applied to the display stack can be included in a range of 0.5 kgf to 12 kgf. In another illustrative implementation, the external force applied to the display stack can be included in a range of 4 kgf to 8 kgf.

In some scenarios, the external force can be applied to the display stack for a duration of at least 20 minutes, at least 25 minutes, or at least 30 minutes. Additionally, the external force can be applied to the display stack for a duration of no greater than 60 minutes, no greater than 50 minutes, or no greater than 40 minutes. In an illustrative implementation, the external force can be applied to the display stack for a duration included in a range of 15 minutes to 80 minutes. In an additional illustrative implementation, the external force can be applied to the display stack for a duration included in a range of 35 minutes to 45 minutes.

At 406, the process 400 can include heating the display stack. In some situations, the display stack can be heated while the external force is applied to the display stack. In an implementation, heating the display stack can include annealing the LOCA in a chamber. In one implementation, the chamber can include an autoclave chamber.

In a particular implementation, the display stack can be heated at a temperature of at least 65° C., at least 75° C., or at least 85° C. Additionally, the display stack can be heated at a temperature no greater than 120° C., no greater than 110° C., or no greater than 100° C. In an illustrative implementation, the display stack can be heated at a temperature included in a range of 60° C. to 110° C. In another illustrative implementation, the display stack can be heated at a temperature included in a range of 80° C. to 100° C.

Further, the display stack can be heated for a duration of at least 20 minutes, at least 25 minutes, or at least 30 minutes. In some cases, the display stack can be heated for a duration no greater than 50 minutes, no greater than 45 minutes, or no greater than 40 minutes. In an illustrative implementation, the display stack can be heated for a duration included in a range of 15 minutes to 60 minutes. In an additional illustrative implementation, the display stack can be heated for a duration included in a range of 25 minutes to 35 minutes. In some situations, heating the display stack in a chamber can further cure the LOCA of the display stack. For example, after heating the display stack, the display stack can be about 100% cured, about 95% cured, or about 90% cured.

In some instances, after the display stack has been heated for a specified duration, the temperature applied to the display stack can be cooled at a particular rate. In an implementation, the temperature applied to the display stack can be cooled at a rate of at least 0.6° C. per minute, at least 0.9° C. per minute, or at least 1.3° C. per minute. In another implementation, the temperature applied to the display stack can be cooled at a rate no greater than 3° C. per minute, no greater than 2.5° C. per minute, or no greater than 2° C. per minute. In an illustrative implementation, the temperature applied to the display stack can be cooled at a rate included in a range of 0.5° C. to 3.5° C. per minute. In another illustrative implementation, the temperature applied to the display stack can be cooled at a rate included in a range of 0.8° C. to 1.2° C.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLES

Example 1

A display stack is assembled according to a conventional process. An optically clear adhesive (OCA) is applied to a surface of a light guide portion of the display stack using roll-to-roll lamination at about room temperature. The light guide portion and OCA are subject to a heat pressing process at about 80° C. for about 2.5 minutes. The light guide and OCA are coupled to a cover layer portion using screen lamination at about room temperature. Further, the light guide portion, OCA, and cover layer portion are coupled to an electronic paper display with a liquid optically clear adhesive (LOCA) using a mechanical lamination process at about room temperature. The LOCA is X360284A from Henkel AG & Co. of Dusseldorf, Germany. The LOCA is subjected to a pre-cure operation by exposing the display stack to ultraviolet (UV) radiation having a wavelength of about 405 nm at a temperature of about 37° C. The LOCA is then subjected to a main curing operation by exposing the display stack to UVA radiation at about 3000 mJ and a temperature of about 57° C. Further, the LOCA is subjected to a first side curing operation by exposing the sides of the display stack to UV radiation having a wavelength of about 365 nm for about 20 seconds and a second side curing operation by exposing the sides of the display stack to UV radiation having a wavelength of about 365 nm for about 20 seconds. The display stack is then placed in an autoclave and heated at a temperature of about 40° C. for a duration of about 30 minutes. Compressed air is applied to all sides of the display stack at 4.5 kgf while the display stack is in the autoclave.

Figure 4:
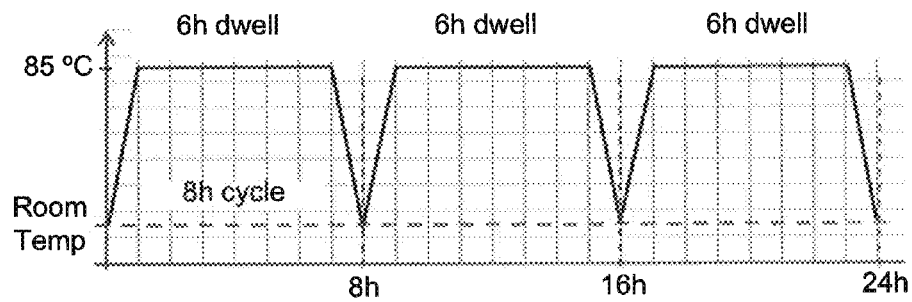
FIG. 4 illustrates conditions of a testing operation for the display stacks formed according to example 1 and example 2.

The height of the display stack is measured using on-machine measurement techniques before a testing operation and after the testing operation. FIG. 4 illustrates conditions of a testing operation for the display stacks formed according to example 1 and example 2. The testing operation includes three cycles of about 8 hours each. During each cycle, the temperature applied to the display stack is increased from about room temperature to about 85° C. in a duration of about 1 hour and the temperature is then held steady for about 6 hours. The temperature is then decreased over a duration of about an hour from about 85° C. to about room temperature.

Table 1 includes measurements of the height of the stack at 15 different locations on the display stack before the testing operation. Table 2 includes on-machine measurements of the height of the stack at approximately the same 15 points after the testing operation.

TABLE 1

On-machine measurements taken before a testing operation for a display stack prepared according to a conventional process.

| Location | Measurement 1 (mm) | Measurement 2 (mm) | Measurement 3 (mm) | Measurement 4 (mm) |
|---|---|---|---|---|
| 1 | 2.7880 | 2.6265 | 2.6411 | 2.6689 |
| 2 | 2.6659 | 2.5389 | 2.6613 | 2.6379 |
| 3 | 2.7900 | 2.6770 | 2.8881 | 2.7754 |
| 4 | 2.5045 | 2.4348 | 2.4099 | 2.4486 |
| 5 | 2.4074 | 2.3502 | 2.4109 | 2.3395 |
| 6 | 2.5322 | 2.4664 | 2.6202 | 2.5601 |
| 7 | 2.3958 | 2.3802 | 2.3147 | 2.3238 |
| 8 | 2.2919 | 2.2927 | 2.3034 | 2.2976 |
| 9 | 2.3922 | 2.3880 | 2.4798 | 2.4600 |
| 10 | 2.4205 | 2.4265 | 2.3481 | 2.3245 |
| 11 | 2.3107 | 2.3141 | 2.3228 | 2.3106 |
| 12 | 2.4142 | 2.4121 | 2.4831 | 2.4943 |
| 13 | 2.5833 | 2.5556 | 2.4802 | 2.4268 |
| 14 | 2.4691 | 2.4637 | 2.4480 | 2.4266 |
| 15 | 2.5747 | 2.5600 | 2.6081 | 2.6181 |

TABLE 2

On-machine measurements taken after a testing operation for a display stack prepared according to a conventional process.

| Location | Measurement 1 (mm) | Measurement 2 (mm) | Measurement 3 (mm) | Measurement 4 (mm) |
|---|---|---|---|---|
| 1 | 4.1368 | 4.2363 | 4.4055 | 4.1009 |
| 2 | 3.7832 | 3.8403 | 3.8973 | 3.7152 |
| 3 | 4.1862 | 4.2934 | 4.1134 | 4.0697 |
| 4 | 2.9646 | 3.0077 | 3.1150 | 2.9899 |
| 5 | 2.7159 | 2.7549 | 2.7893 | 2.7103 |
| 6 | 3.0062 | 3.0671 | 2.9431 | 2.9671 |
| 7 | 2.4475 | 2.4481 | 2.4623 | 2.4430 |
| 8 | 2.2847 | 2.2903 | 2.2954 | 2.2864 |
| 9 | 2.4642 | 2.5044 | 2.4346 | 2.4914 |
| 10 | 2.7737 | 2.7185 | 2.6170 | 2.6627 |
| 11 | 2.5397 | 2.4941 | 2.4781 | 2.5166 |
| 12 | 2.7599 | 2.7741 | 2.7445 | 2.8159 |
| 13 | 3.7829 | 3.6375 | 3.3344 | 3.4430 |
| 14 | 3.4655 | 3.3101 | 3.2302 | 3.3140 |
| 15 | 3.7651 | 3.7052 | 3.6615 | 3.7707 |

Example 2

A display stack is assembled according to implementations described herein. An optically clear adhesive (OCA) is applied to a surface of a light guide portion of the display stack using roll-to-roll lamination at about room temperature. The light guide portion and OCA are subject to a heat pressing process at about 80° C. for about 2.5 minutes. The light guide and OCA are coupled to a cover layer portion using screen lamination at about room temperature. Further, the light guide portion, OCA, and cover layer portion are coupled to an electronic paper display with a liquid optically clear adhesive (LOCA) using a mechanical lamination process at about room temperature. The LOCA is Loctite® 5192 from Henkel AG & Co. of Dusseldorf, Germany. The LOCA is subjected to a pre-cure operation by exposing the display stack to ultraviolet (UV) radiation for a duration of about 80 seconds. The display stack is then placed into an autoclave chamber and heated at a temperature of about 85° C. for a duration of about 30 minutes. Additionally, the display stack is placed in a vertical orientation between two glass plates and an external force of about 4 kgf is applied to the display stack by contacting the glass plates with a top surface of the display stack and a bottom surface of the display stack. The cooling rate of the temperature applied to the display stack is about 1° C. per minute.

The height of the display stack is measured using on-machine measurement techniques before the testing operation and after the testing operation. Table 3 includes measurements of the height of the display stack at 15 different points before the testing operation. Table 4 includes measurements of the height of the display stack at approximately the same 15 points after the testing operation.

TABLE 3

On-machine measurements taken before a testing operation for a display stack prepared according to implementations described herein.

| Location | Measurement 1 (mm) | Measurement 2 (mm) | Measurement 3 (mm) | Measurement 4 (mm) |
|---|---|---|---|---|
| 1 | 2.3283 | 2.3340 | 2.4451 | 2.4457 |
| 2 | 2.2638 | 2.2675 | 2.3473 | 2.3675 |
| 3 | 2.3513 | 2.3274 | 2.4125 | 2.4567 |
| 4 | 2.3008 | 2.2909 | 2.3394 | 2.3452 |
| 5 | 2.2275 | 2.2303 | 2.2584 | 2.2625 |
| 6 | 2.3082 | 2.2831 | 2.3166 | 2.3297 |
| 7 | 2.3133 | 2.3014 | 2.3042 | 2.3110 |
| 8 | 2.2368 | 2.2352 | 2.2425 | 2.2396 |
| 9 | 2.3076 | 2.2894 | 2,3140 | 2.3182 |
| 10 | 2.3174 | 2.3024 | 2.2997 | 2.3191 |
| 11 | 2.2476 | 2.2473 | 2.2478 | 2.2503 |
| 12 | 2.3074 | 2.2984 | 2.3278 | 2.3261 |
| 13 | 2.3071 | 2.2930 | 2.3096 | 2.3635 |
| 14 | 2,2471 | 2.2472 | 2.2958 | 2.3043 |
| 15 | 2.3110 | 2.3185 | 2.3681 | 2.3652 |

TABLE 4

On-machine measurements taken after a testing operation for a display stack prepared according to implementations described herein.

| Location | Measurement 1 (mm) | Measurement 2 (mm) | Measurement 3 (mm) | Measurement 4 (mm) |
|---|---|---|---|---|
| 1 | 2.8822 | 2.7629 | 2.7312 | 2.9138 |
| 2 | 2.7627 | 2.6495 | 2.6370 | 2.7540 |
| 3 | 2.9851 | 2.8227 | 2.8324 | 2.9340 |
| 4 | 2.4985 | 2.4367 | 2.4316 | 2.5204 |
| 5 | 2.3917 | 2.3371 | 2.3317 | 2.3855 |
| 6 | 2.5672 | 2.4969 | 2.5183 | 2.5376 |
| 7 | 2.3374 | 2.3140 | 2.3223 | 2.3593 |
| 8 | 2.2429 | 2.2374 | 2.2252 | 2.2409 |
| 9 | 2.4165 | 2.3884 | 2.3941 | 2.3925 |
| 10 | 2.4456 | 2.4026 | 2.4152 | 2.4518 |
| 11 | 2.3261 | 2.3055 | 2.3007 | 2.3306 |
| 12 | 2.5000 | 2.4744 | 2.4666 | 2.4931 |
| 13 | 2.7530 | 2.6572 | 2.6635 | 2.7485 |

TABLE 4-continued

On-machine measurements taken after a testing operation for a display stack prepared according to implementations described herein.

| Location | Measurement 1 (mm) | Measurement 2 (mm) | Measurement 3 (mm) | Measurement 4 (mm) |
|---|---|---|---|---|
| 14 | 2.6285 | 2.5665 | 2.5529 | 2.6341 |
| 15 | 2.7904 | 2.7521 | 2.7035 | 2.7945 |

Figure 5:
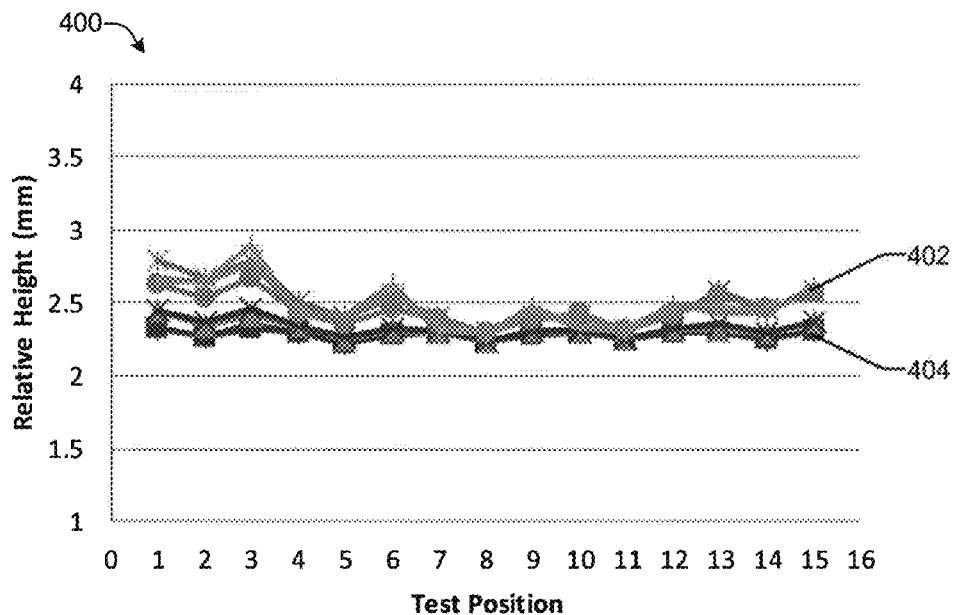
FIG. 5 illustrates a graph indicating a height measured on a number of locations of a display stack formed according to a conventional process and a display stack formed according to embodiments described herein before undergoing the testing conditions shown in FIG. 4.

FIG. 5 illustrates a graph 400 indicating a height measured on a number of locations of a display stack formed according to a conventional process and a display stack formed according to implementations described herein before undergoing the testing conditions shown in FIG. 4. In particular, the data shown along lines 402 are associated with the height of locations of the display stack formed according to a conventional process before the display stack undergoes the testing operation. Additionally, the data shown along lines 404 are associated with the height of locations of the display stack formed according to implementations described herein before the display stack undergoes the testing operation.

Figure 6:
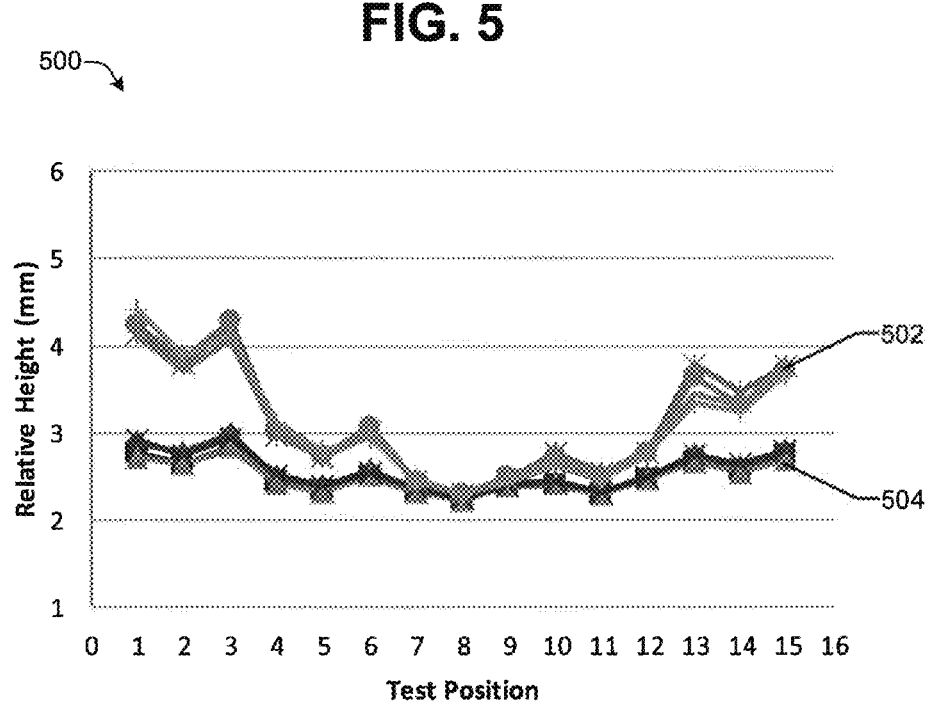
FIG. 6 illustrates a graph indicating a height measured on a number of locations of a display stack formed according to a conventional process and a display stack formed according to embodiments described herein after undergoing the testing conditions shown in FIG. 4.

FIG. 6 illustrates a graph 500 indicating a height measured on a number of locations of a display stack formed according to a conventional process and a display stack formed according to implementations described herein after undergoing the testing conditions shown in FIG. 4. In particular, the data shown along lines 502 are associated with the height of locations of the display stack formed according to a conventional process after the display stack undergoes the testing operation. Additionally, the data shown along lines 504 are associated with the height of locations of the display stack formed according to implementations described herein after the display stack undergoes the testing operation.

The data shown in FIG. 5 and FIG. 6 indicates that after the testing operation, the height of the display stack formed according to a conventional process is greater at most of the locations measured than the height of the display stack formed according to implementations described herein. Additionally, a change in the height of the display stack from before the testing operation to after the testing operation is greater for the display stack formed according to the conventional process than for the display stack formed according to implementations described herein. The change in the height of the display stack from before the testing operation to after the testing operation can be an indication of warping in display substrates of the display stack. Thus, more warping of substrates of the display stack formed according to the conventional process occurs than with respect to substrates of the display stack formed according to implementations described herein.

Table 5 indicates the average difference between the height of the display stack measured before the testing operation and the height of the display stack measured after the testing operation when the display stack is formed according to a conventional process and when the display stack is formed according to implementations described herein. The average height of the display stack is calculated by adding the four measurements of the height of the display stack at each location from Tables 1-4 and then dividing by the total number of measurements taken. The data shown in Table 5 indicates that the average difference between the height of the display stack measured before the testing operation and after the testing operation for the display stack formed according to implementations described herein is less than the average difference between the height of the display stack measured before and after the testing operation for the display stack formed according to a conventional process. Thus, the warping of the display stack formed according to implementations described herein is less than the warping of the display stack formed according to a conventional process.

TABLE 5

Average height difference in display stack formed according to a conventional process and a display stack formed according to implementations described herein before and after a testing operation.

| Location | Average Height Difference (mm) for Display Stack of Conventional Process | Average Height Difference (mm) for Display Stack of Implementations Described Herein |
|---|---|---|
| 1 | 1.53875 | 0.43425 |
| 2 | 1.183 | 0.389275 |
| 3 | 1.38305 | 0.50675 |
| 4 | 0.56985 | 0.152725 |
| 5 | 0.3656 | 0.116825 |
| 6 | 0.45115 | 0.2206 |
| 7 | 0.0966 | 0.025775 |
| 8 | −0.0072 | −0.00192 |
| 9 | 0.04365 | 0.079675 |
| 10 | 0.313075 | 0.11915 |
| 11 | 0.192575 | 0.067475 |
| 12 | 0.322675 | 0.165225 |
| 13 | 1.037975 | 0.38725 |
| 14 | 2.6285 | 2.5665 |
| 15 | 2.7904 | 2.7521 |

What is claimed is:

1. A process comprising:
    coupling a first surface of a front light portion of a display stack of an electronic device to a first surface of a touch sensor portion of the display stack with a first adhesive, wherein a second surface of the touch sensor portion is coupled to a cover layer portion of the display stack;
    coupling a second surface of the front light portion of the display stack to an image-displaying portion of the display stack with a second adhesive, the second surface of the front light portion being substantially parallel to the first surface of the front light portion, and the second adhesive including a liquid optically clear adhesive (LOCA);
    placing the display stack into a chamber of an apparatus having a first fixture and a second fixture such that the image-displaying portion rests on top of the first fixture;
    applying an external force to the display stack by lowering the second fixture to contact the cover layer portion; and
    heating the chamber of the apparatus to a temperature of at least 60° C. for a duration of at least 20 minutes.

2. The process of claim 1, further comprising cooling the temperature in the chamber at a rate of at least 0.7° C. per minute.

3. The process of claim 1, wherein the external force applied to the display stack by the first fixture and the second fixture is at least 2 kgf.

4. The process of claim 1, wherein the LOCA includes a silicone-containing LOCA.

5. A process comprising:
    coupling a first substrate of a display stack of an electronic device to a second substrate of the display stack with a liquid optically clear adhesive (LOCA), wherein a LOCA has a percent elongation at break from 325% to 475%; and applying an external force to at least one of a top portion of the display stack or a bottom portion of the display stack after coupling the first substrate of the display stack to the second substrate of the display stack.

6. The process of claim 5, further comprising placing the display stack in a chamber of an apparatus including a first fixture and a second fixture, wherein the external force is applied to the top portion of the display stack and the bottom portion of the display stack with the first fixture and the second fixture of the apparatus.

7. The process of claim 5, wherein the external force is included in a range of 2 kgf to 8 kgf.

8. The process of claim 5, wherein the external force is applied to the display stack for a duration included in a range of 15 minutes to 45 minutes.

9. The process of claim 5, further comprising heating the display stack at a temperature included in a range of 80° C. to 100° C. while applying the external force to the display stack.

10. A process comprising:
coupling a first substrate of a display stack of an electronic device to a second substrate of the display stack with a liquid optically clear adhesive (LOCA);
heating the display stack in a chamber at a temperature included in a range of 60° C. to 110° C. after coupling the first substrate of the display stack to the second substrate of the display stack; and
cooling the display stack at a rate of between 0.5° C. per minute and 3.5° C. per minute.

11. The process of claim 10, wherein the display stack is heated in the chamber at the temperature for a duration included in a range of 15 minutes to 75 minutes.

12. The process of claim 10, further comprising applying the LOCA to the first substrate, the second substrate, or both, wherein a viscosity of the LOCA is included in a range of 31,000 cp to 39,000 cp.

13. The process of claim 10, further comprising applying the LOCA to the first substrate, the second substrate, or both, wherein a viscosity of the LOCA is included in a range of 4200 cp to 4700 cp.

14. The process of claim 10, further comprising pre-curing the LOCA for a duration included in a range of 80 seconds to 110 seconds, wherein the LOCA is pre-cured before heating the display stack in the chamber at the temperature included in the range of 60° C. to 110° C.

15. The process of claim 10, further comprising applying an external force to a top portion of the display stack and a bottom portion of the display stack during the heating of the display stack in the chamber.

16. A process comprising:
applying a liquid optically clear adhesive (LOCA) to a first surface of an image-displaying portion of a display stack or a second surface of a front light portion of the display stack, wherein the LOCA has a modulus of elasticity of no greater than 80,000 Pa;
coupling the image-displaying portion to the front light portion with the LOCA; and
coupling the front light portion to a cover layer portion with an additional adhesive.

17. The process of claim 16, further comprising:
placing a first portion of the display stack onto a first fixture of an apparatus;
applying an external force to the display stack by moving a second fixture of the apparatus to contact a second portion of the display stack, wherein:
the second fixture of the apparatus is substantially parallel with the first fixture,
the external force applied is included in a range of 0.5 kgf to 12 kgf, and
the external force is applied for a duration included in a range of 15 minutes to 80 minutes; and
heating the display stack at a temperature from 60° C. to 110° C. while the external force is applied to the display stack.

18. The process of claim 17, further comprising, after heating the display stack, cooling the temperature at a rate included in a range of 0.5° C. per minute to 3.5° C. per minute.

19. The process of claim 16, further comprising:
exposing the LOCA to ultraviolet (UV) radiation for a duration included in a range of 30 seconds to 120 seconds to cure from at least 50% to no greater than 75% of the LOCA.

20. The process of claim 16, wherein a refractive index of the LOCA is included in a range of 1.40 to 1.45 and a viscosity of the LOCA is at least 2000 cp and no greater than 5500 cp.

* * * * *